Figure 1:
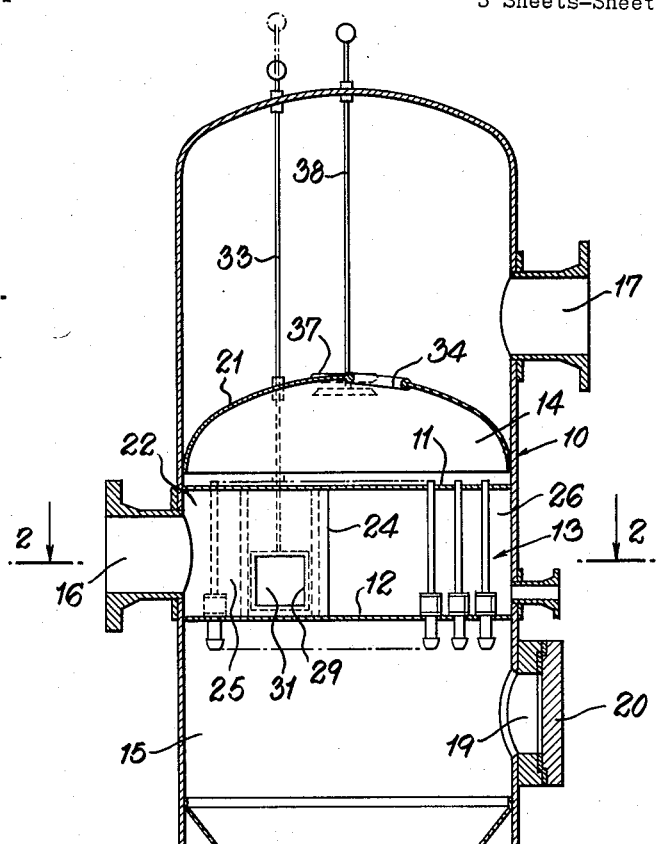

Sept. 1, 1964  J. L. BURDOCK ETAL  3,147,099
MULTIPLE COMPARTMENT CENTRIFUGAL SEPARATOR
Filed Aug. 29, 1961  3 Sheets-Sheet 1

INVENTORS
Joseph L. Burdock
Angelo J. Cioffi
BY
Benj. T. Rauber
ATTORNEY

Sept. 1, 1964 J. L. BURDOCK ETAL 3,147,099
MULTIPLE COMPARTMENT CENTRIFUGAL SEPARATOR
Filed Aug. 29, 1961 3 Sheets-Sheet 2
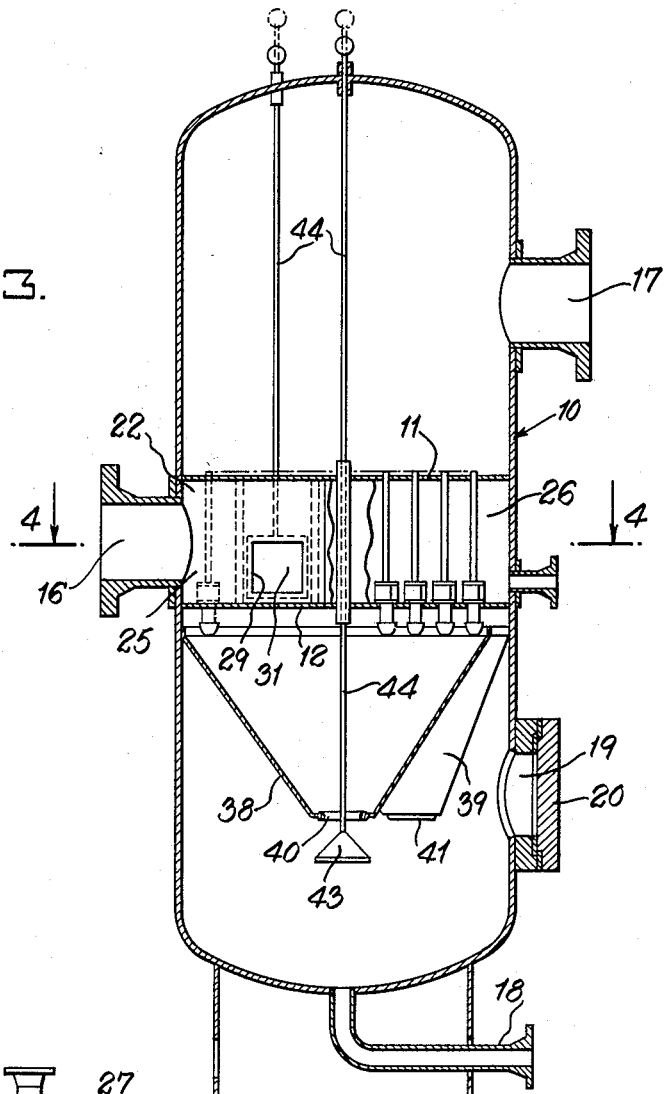
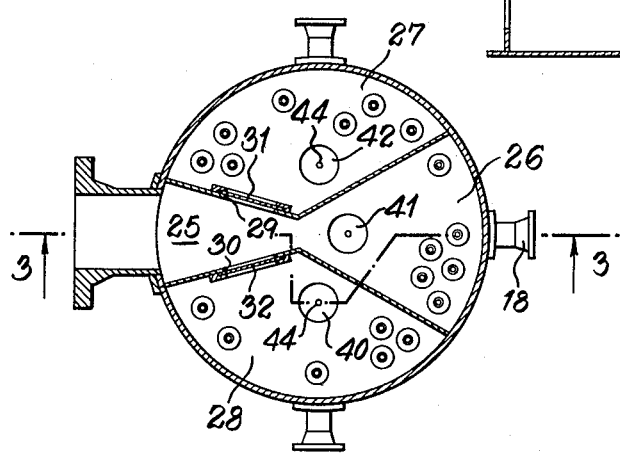
INVENTORS
Joseph L. Burdock
Angelo J. Cioffi
BY
Benj. T. Rauber
ATTORNEY Sept. 1, 1964  J. L. BURDOCK ETAL  3,147,099
MULTIPLE COMPARTMENT CENTRIFUGAL SEPARATOR
Filed Aug. 29, 1961  3 Sheets-Sheet 3
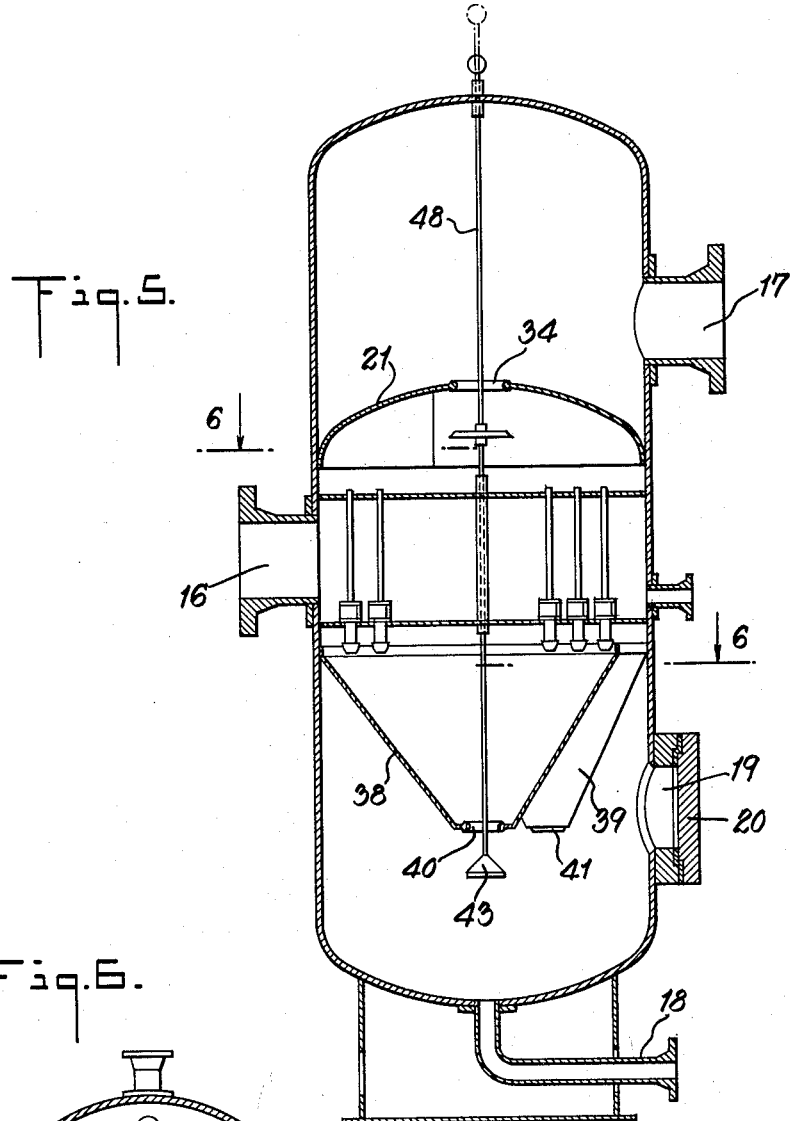
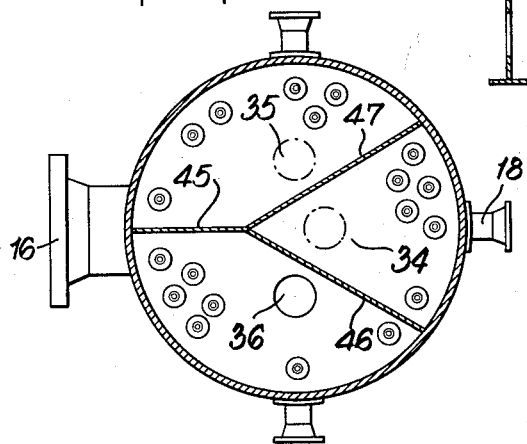
INVENTORS.
Joseph L. Burdock
Angelo J. Cioffi
BY
Benj. T. Rauber
ATTORNEY

United States Patent Office 3,147,099
Patented Sept. 1, 1964

3,147,099
MULTIPLE COMPARTMENT CENTRIFUGAL SEPARATOR
Joseph L. Burdock, Old Greenwich, and Angelo J. Cioffi, Greenwich, Conn., assignors to Aerotec Industries, Inc., Greenwich, Conn., a corporation of Connecticut
Filed Aug. 29, 1961, Ser. No. 134,715
7 Claims. (Cl. 55—344)

Our invention relates to a multiple compartment centrifugal separator for separating from a gaseous medium particles suspended therein. More particularly the invention relates to separators of the above type in which the volume of gaseous medium varies widely at different times.

In some industries, such as the natural gas industry, the amount of gas being consumed varies seasonally being generally greater in winter months than in the summer. This situation presents a problem because the efficiency of separation is affected by the speed of the gas through the centrifugal separators required for the removal of condensed liquids entrained in the gas. Thus a separator designed to give the best speed of gas through the tubes of the separator during a period of maximum demand would be too large to provide the most efficient speed of gas during a period of reduced demand.

This problem may be met by having a number of separator units of different sizes for use with different volumes of gas or a number of units of a size suitable for minimum demand and using more of them for increased demand. This, however, requires an extensive installation and piping.

Our invention provides a separating unit which enables different volumes to be treated under conditions approximating optimum for the several volumes treated.

In our invention we provide a single unit or container having compartments in which the centrifugal tubes are mounted and means to put in operation one or any number of additional compartments.

The container in our invention is divided by spaced tube sheets into a plenum chamber, an off-take chamber on one side of the plenum chamber and a collecting chamber on the opposite side of the plenum chamber. These chambers may be arranged in vertical series by means of horizontal tube sheets, the off-take chamber being uppermost, the plenum chamber beneath the off-take chamber and the collecting chamber beneath the plenum chamber. The centrifugal tubes are then mounted in the lower tube sheet to receive gas to be treated from the plenum chamber and opening into the collecting chamber to deliver separated material thereto. The cleaned gas is received in off-take pipes mounted in the upper tube sheet and extending downwardly into the upper part of the centrifugal tubes, one for each tube and co-axially thereof, to form an annular passage for the passage of gas spirally downwardly between the tube and the off-take pipe and then upwardly in the latter to be delivered to the off-take chamber. Gas to be cleaned is delivered to the plenum chamber, the cleaned gas is delivered from the off-take chamber and the separated material is drained from the collecting chamber.

Each of the centrifugal tubes has an inlet from the plenum chamber an outlet through the off-take pipe and an outlet through the collecting chamber. To separate a group of tubes from the passage of gases and thus remove it from operation it is necessary to close a pair of these passages, that is, the inlet and either outlet or the outlets. Otherwise, if but one is closed, gas may pass from the two open passages, the inlet and one of the outlets from one group into and through the tubes of the other. In our invention, therefore, we divide, by means of partitions, the plenum chamber and the outlet chamber or the collecting chamber into two or more compartments or the outlet and the collecting chamber into two or more compartments and provide an opening and a damper in each partition. Thus, if the amount of gas to be treated is at a minimum all dampers are moved to closed position and the tubes in but one compartment are used. If more than the minimum is to be treated a pair of dampers is opened to put two compartments in operation and if still more gas is to be treated up to the maximum of capacity. The compartments may be equal or different in capacity.

Figure 2:
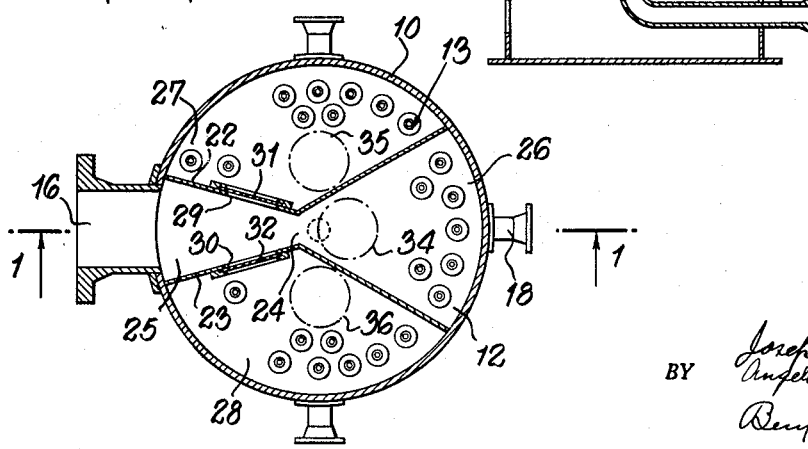

The invention is illustrated by way of example in the accompanying drawings, in which:

FIG. 1 is a vertical section and FIG. 2 horizontal section on line 2—2 of FIG. 1 of a centrifugal separator in which the plenum chamber and the off-take chamber are each divided into compartments, three being shown by way of example, FIG. 3 is a vertical section and FIG. 4 a horizontal section on line 4—4 of FIG. 3 of a centrifugal separator in which the plenum chamber and the collecting chamber are divided into three compartments, the collecting chamber being divided into three collecting hoppers which serve as partitions there being one hopper for each compartment of the plenum chamber, and, FIG. 5 is a vertical section and FIG. 6 a horizontal section on line 6—6 of FIG. 5 of a centrifugal separator in which the plenum chamber is not divided into compartments and in which the off-take chamber is divided into three compartments by partitions and the collecting chamber is divided into three corresponding hoppers.

Referring to FIGS. 1 and 2, the separator comprises a container 10 divided by an upper tube sheet 11 and a lower tube sheet 12 into a plenum chamber 13, an off-take chamber 14 above the plenum chamber and a collecting chamber 15 below the plenum chamber. The container is provided with an inlet 16 to the plenum chamber, an outlet 17 from the top of the container and a drain 18 from the bottom of the collecting chamber. A manhole 19 is provided for the collecting chamber normally closed by a cover 20. A partition 21, preferably dome shaped, separates the off-take chamber 14 from an outlet chamber opening to the outlet 17.

A pair of partitions 22 and 23 extend in the plenum chamber from opposite sides of the inlet 16 to a throat 24 and then diverge to divide the chamber into a passage 25 leading to a central compartment 26 and a pair of side compartments 27 and 28. Openings 29 in the partition 22 and 30 in the partition 23 connect the passage 25 with the compartments 27 and 28, respectively. These openings may be closed by sliding dampers 31 and 32, respectively operated by rods 33 extending upwardly through the top of the container. The compartment 26 is thus open to the inlet 16 and the compartments 27 and 28 may be opened to the inlet 16 by opening the dampers 31 and 32.

In the tube sheet 12 within the areas of the compartments 26, 27 and 28 centrifugal tubes are mounted to receive gas from the various compartments and to deliver separated material to the collecting chamber 15. In the upper tube sheet 11 open ended off-take pipes, one for each tube, are mounted to extend downwardly into the upper part of each tube, the off-take pipes being of smaller diameter than the tubes and extending co-axially thereinto to form an annular passage into which the gas from the plenum chamber is delivered in a downward spiral path about the off-take pipe. The cleaned gas enters the lower end of the off-take pipe and is delivered to the off-take chamber 14.

In the off-take chamber 14 a pair of vertical partitions extend in the planes of the partitions 22 and 23 from the tube sheet 11 upwardly to the domed partition 21 and thus form compartments immediately above the compartments 26, 27 and 28. Each of these compartments has an opening indicated in the broken line circles 34, 35 and 36. The openings 35 and 36 may be closed by dampers indicated at 37 in FIG. 1 controlled by rods 38 extending upwardly through the top of the container. When the damper 31 closes the opening 29 between the passage 25 the opening 35 in the partition 21 is closed and, similarly when the damper 32 closes the opening 30 the opening 36 is closed by its damper. The opening 34 is not closed by a damper.

In the above arrangement when either of the dampers 31 or 32 and the corresponding dampers close the opening 35 or 36 there can be no flow through the centrifugal tubes in the corresponding compartments 27 or 28 as two of the three openings into and/or from the centrifugal tubes in these compartments are closed, the only passage that is open being the opening through the bottoms of the tubes. There can, therefore, be no recycling of gas from the tubes of the open compartment or compartments through the tubes of a closed compartment.

In the modification illustrated in FIGS. 3 and 4, the container, tube sheets inlet outlet drain, and partitions in the plenum chamber are the same as in FIGS. 1 and 2 and have the same reference numerals. The partition 21 and the vertical partitions in the off-take chamber are omitted. In their place are three hoppers in the collecting chamber one under each of the compartments 26, 27 and 28, the one under compartment 28 being indicated by the reference number 38 in FIG. 3 and the one under compartment 26 being indicated by the number 39. The hopper under the compartment 27 is back of the hopper 38 as viewed in FIG. 3 and therefore is not shown. Each of these hoppers has an opening at its lower, delivery, end the opening of the hopper 38 being indicated in FIG. 4 at 40, the opening of the hopper 39 being indicated at 41, and the opening of the hopper under the compartment 27 being indicated at 42. Each opening may be closed individually by a conical valve 43 as shown for the opening 40 in FIG. 3 operated by a valve stem 44 extending upwardly through the container and through its top wall. The valve for hopper 41 may be omitted as this hopper is open in all combinations of the compartments.

In this modification the damper 31 and the valve for the opening 42 may be closed to close passage of gas into the tubes in the compartment 27 and from the lower ends of these tubes leaving the tubes open through their off-take pipes and, accordingly, no gas can circulate through these tubes when these valves are closed. Similarly when the damper 32 and the valve 43 of the hopper 38 are closed there can be no circulation through the tubes of the compartment 28. With all of these valves closed only the tubes of the compartment 26 are active. When the pairs of valves 31 or 32 and the valves 43 of the corresponding hoppers are opened the tubes of the respective compartments 27 and 28 are active.

In the modification illustrated in FIGS. 5 and 6, the elements shown correspond with similar elements shown in FIGS. 1–4, and are indicated with similar reference numbers except that the partitions 22 and 23 separating the plenum chamber into compartments and their dampers and the rods 33 are omitted. The arrangement of the hoppers is the same as in FIGS. 3 and 4 and the arrangement of the vertical partitions in the off-take chamber may be the same as in FIG. 2 or as shown in FIG. 6. The openings 34, 35 and 36 in the domed partition 21 may be aligned with the openings 40, 41 and 42 of the hoppers and the three pairs of openings in the hoppers and partition 21 controlled by dampers mounted on a vertical rod 48 carrying the valves or dampers of each pair and extending upwardly through the top of the container. The rods movable individually serve to close the outlet compartment and the hopper of each inlet compartment. When any pair of openings is closed, the off-take pipes and the lower ends of the tubes of the compartment are closed and there can be no circulation through these tubes. In this way the apparatus may be operated with one, two or three compartments with no possibility of circulation or recirculation through the tubes of the other compartments.

The apparatus provides in a single container means to operate the separation at a minimum capacity of highest efficiency, at an intermediate capacity of maximum efficiency and at a maximum capacity of maximum efficiency. At capacities between these stages the efficiency will be greater than would be the case if the apparatus were limited to a single capacity of highest efficiency. By having this range in a single container lowers the cost of construction, piping and operation.

Having described our invention, we claim:

1. A multiple compartment centrifugal separator for separating suspended particles from a gas which comprises a container having an upper, and a lower, horizontal tube sheet spaced to form a plenum chamber and to divide said container into a collecting chamber below said lower tube sheet and an off-take chamber above said upper tube sheet, said container having an inlet to said plenum chamber and an outlet from said off-take chamber and a drain from said collecting chamber, at least one partition in at least two of said chambers dividing the respective chambers into at least two compartments, said partitions having passages for gas through said compartment from said inlet to said outlet, centrifugal separating tube assemblies comprising tubes mounted in said lower tube sheet each having an inlet for gas from said plenum chamber and an opening to deliver separated material to said collecting chamber and off-take pipes, one for each tube extending through said upper tube sheet and downwardly and coaxially into the upper part of a tube and opening to said off-take chamber, and at least one pair of dampers, one damper operatively associated with the passage in the partition in one of said chambers and the other operatively associated with the passage in the partition in another of said chambers to close a pair of said compartments from the passage of gas therethrough.

2. The separator of claim 1 having two partitions in said plenum chamber one on each side of said inlet dividing said chamber into a middle compartment and a compartment on each side of said middle compartment, each of said partitions having a passage from said middle compartment to a side compartment, a damper associated with each passage movable to open and to close said passage, a partition above said upper tube sheet spanning said container to divide the space above said upper tube sheet into a lower off-take chamber and an upper outlet chamber, partitions dividing said off-take chamber into three compartments one above said middle compartment and one above each of said side compartments, passages from each of said compartmens of said off-take chamber to said outlet chamber and dampers to close the passages from the side compartments of said plenum chamber and of said off-take chamber.

3. The separator of claim 2 in which said partitions in said plenum chamber extend from said inlet to form a passage and diverge from said passage to form said middle compartment and in which said passages to said side compartments are located in the parts of said partitions forming said passage.

4. The separator of claim 1 having two partitions in said plenum chamber one on each side of said inlet dividing said chamber into a middle compartment and a side compartment on each side of said middle compartment, each of said partitions having a passage from said middle compartment to a side compartment, a damper associated with each passage movable to open and to close said passage, a partition in said collecting chamber for each of the compartments in said plenum chamber forming a hopper compartment into which the tubes of its respective compartment of said plenum chamber deliver and having a delivery opening in its lower end, and a damper associated with each open end of said hopper compartments to open and to close said open lower end.

5. The separator of claim 1 in which said off-take chamber has a partition spanning said off-take chamber above said upper tube sheet and at least one partition dividing the space between said tube sheet and said partition spanning said container into at least two off-take compartments, said partition spanning said container having a passage for each said compartment, a valve for each passage, and a partition in said collecting chamber for each compartment of said off-take chamber forming a hopper into which said tubes deliver said hopper having an open lower end and a valve to open and to close said open end.

6. The separator of claim 5 having means to open and close the valves in said partition and in said hopper of each compartment synchronously.

7. The separator of claim 6 in which said means comprises a rod connecting said valves and extending upwardly through said container.

References Cited in the file of this patent

UNITED STATES PATENTS

| | | |
|---|---|---|
| 2,069,483 | Skajaa | Feb. 2, 1937 |
| 2,152,115 | Van Tongeren | Mar. 28, 1939 |
| 2,226,128 | Harmon | Dec. 24, 1940 |
| 2,268,170 | Schmidt | Dec. 30, 1941 |